B. BISCHOF.
INTERNAL COMBUSTION TURBINE.
APPLICATION FILED OCT. 20, 1914.

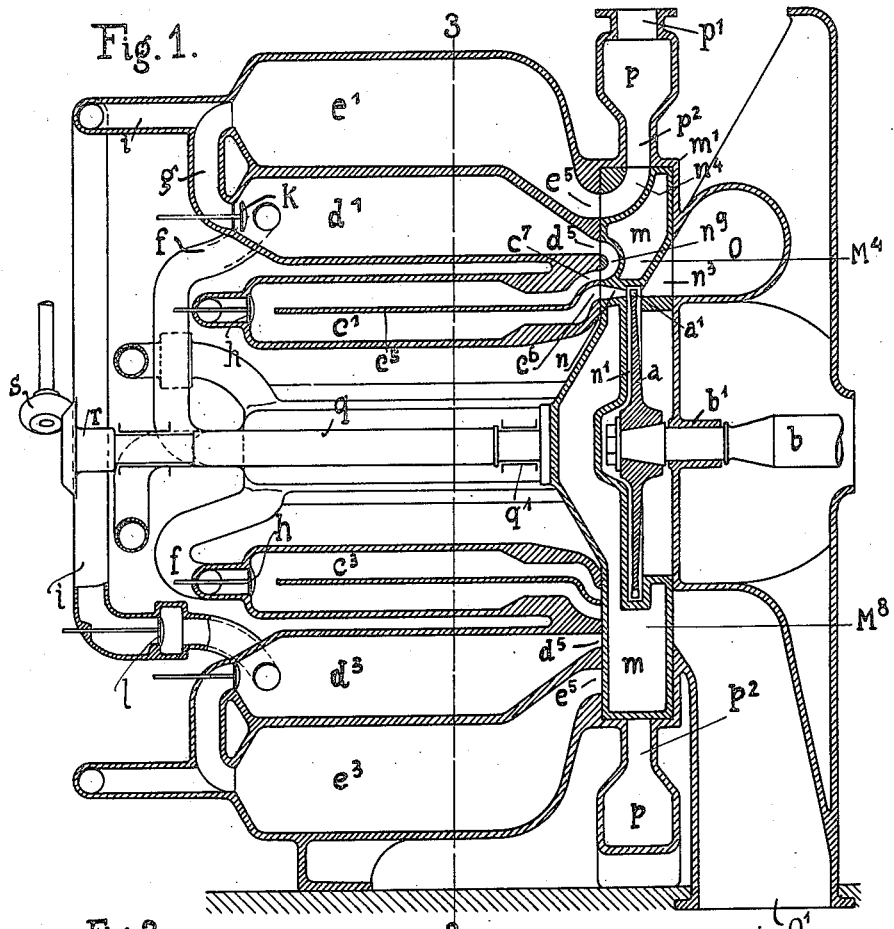
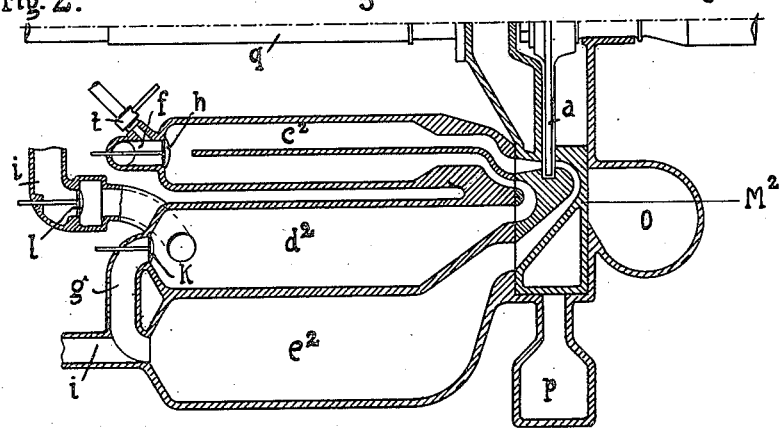

1,129,544.

Patented Feb. 23, 1915.
12 SHEETS—SHEET 3.

WITNESSES:

INVENTOR
Bernhard Bischof
BY
ATTORNEYS

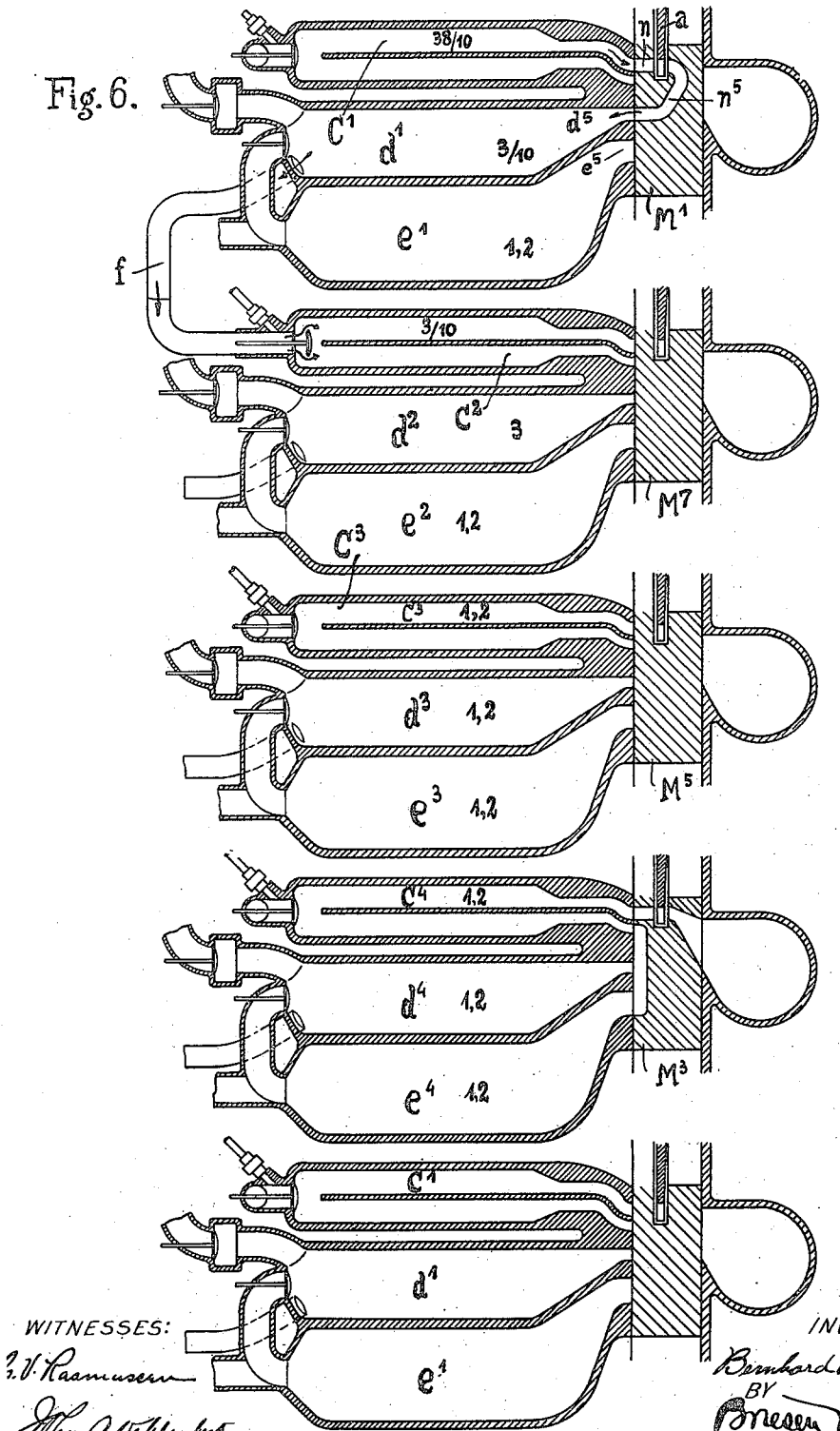

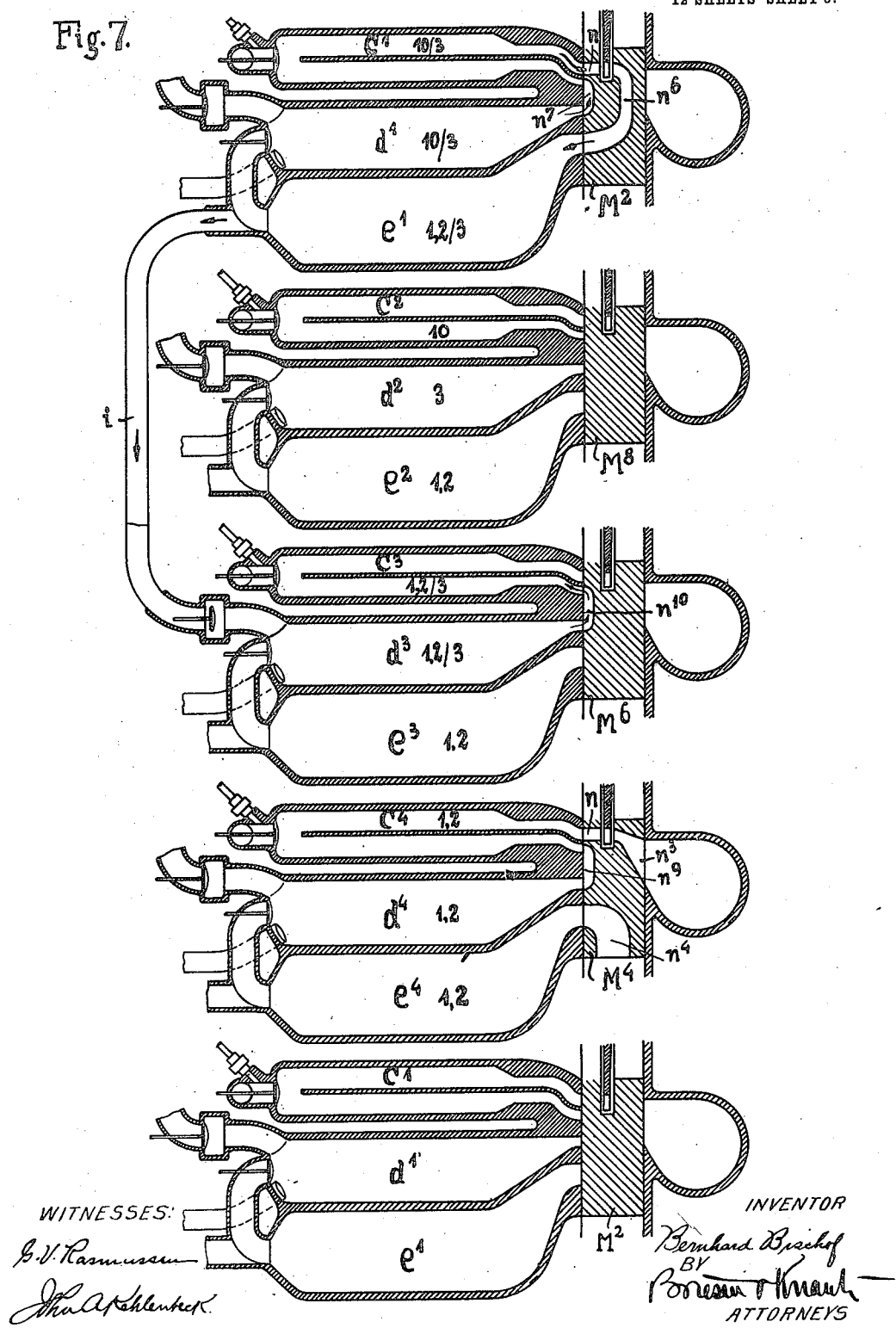

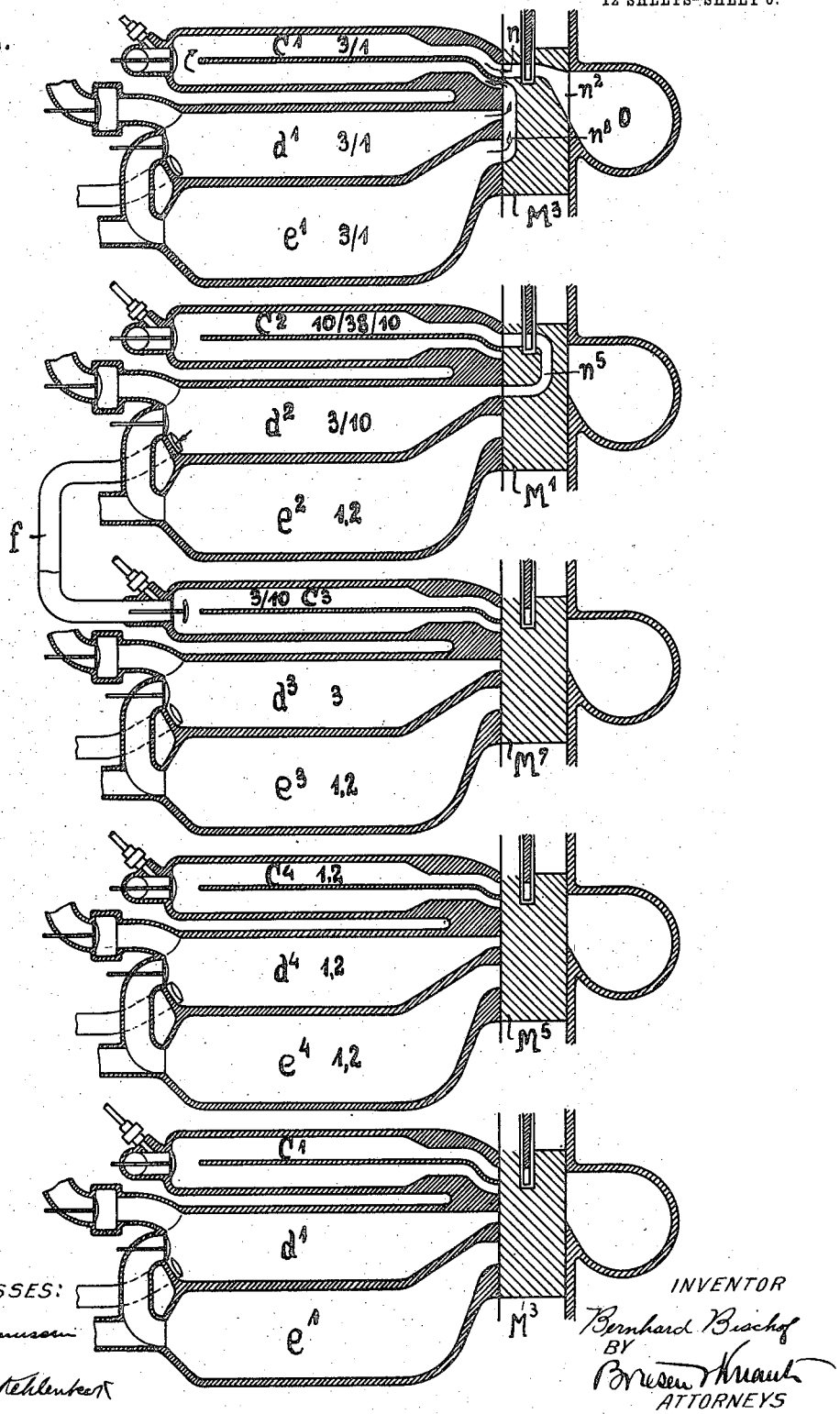

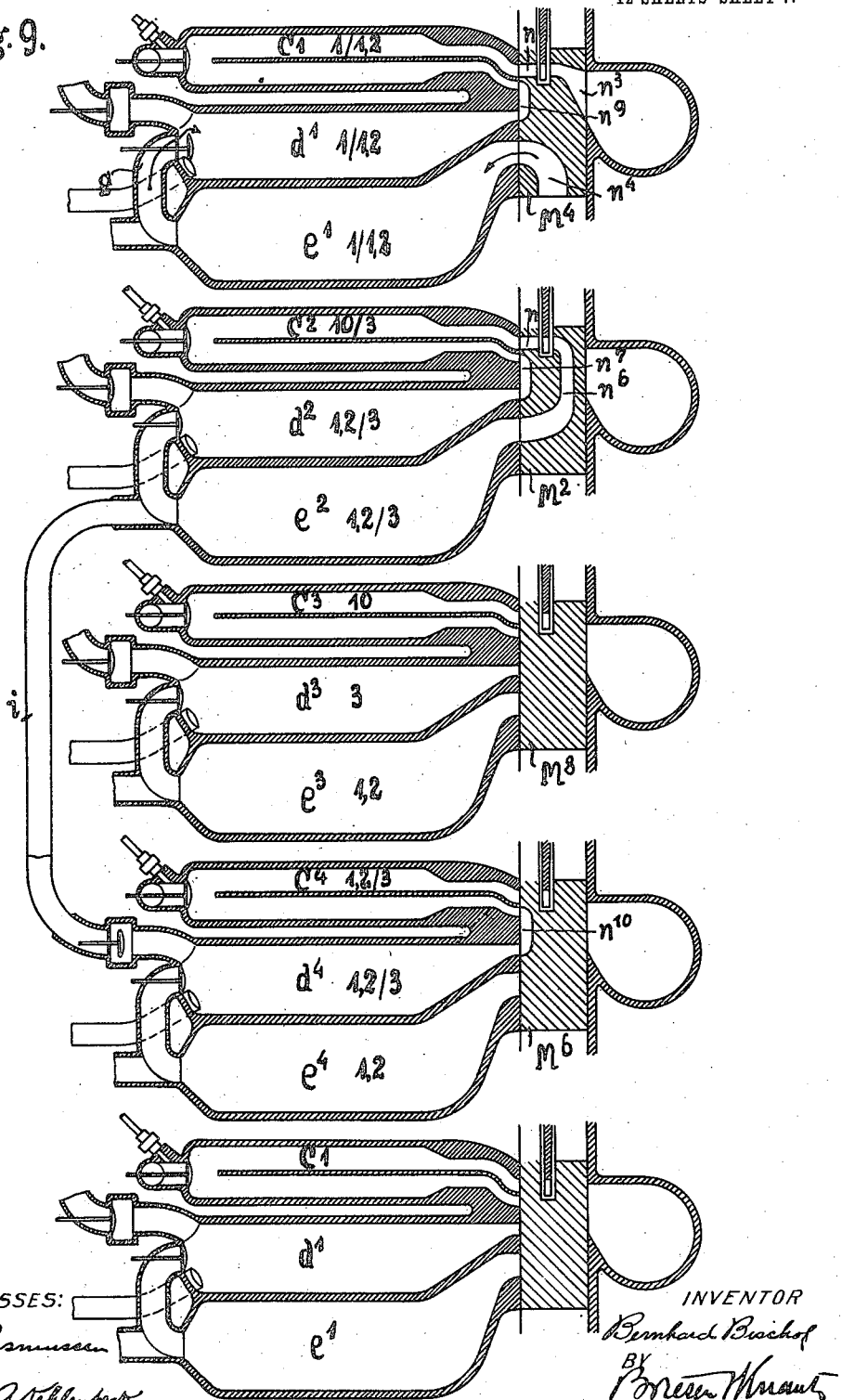

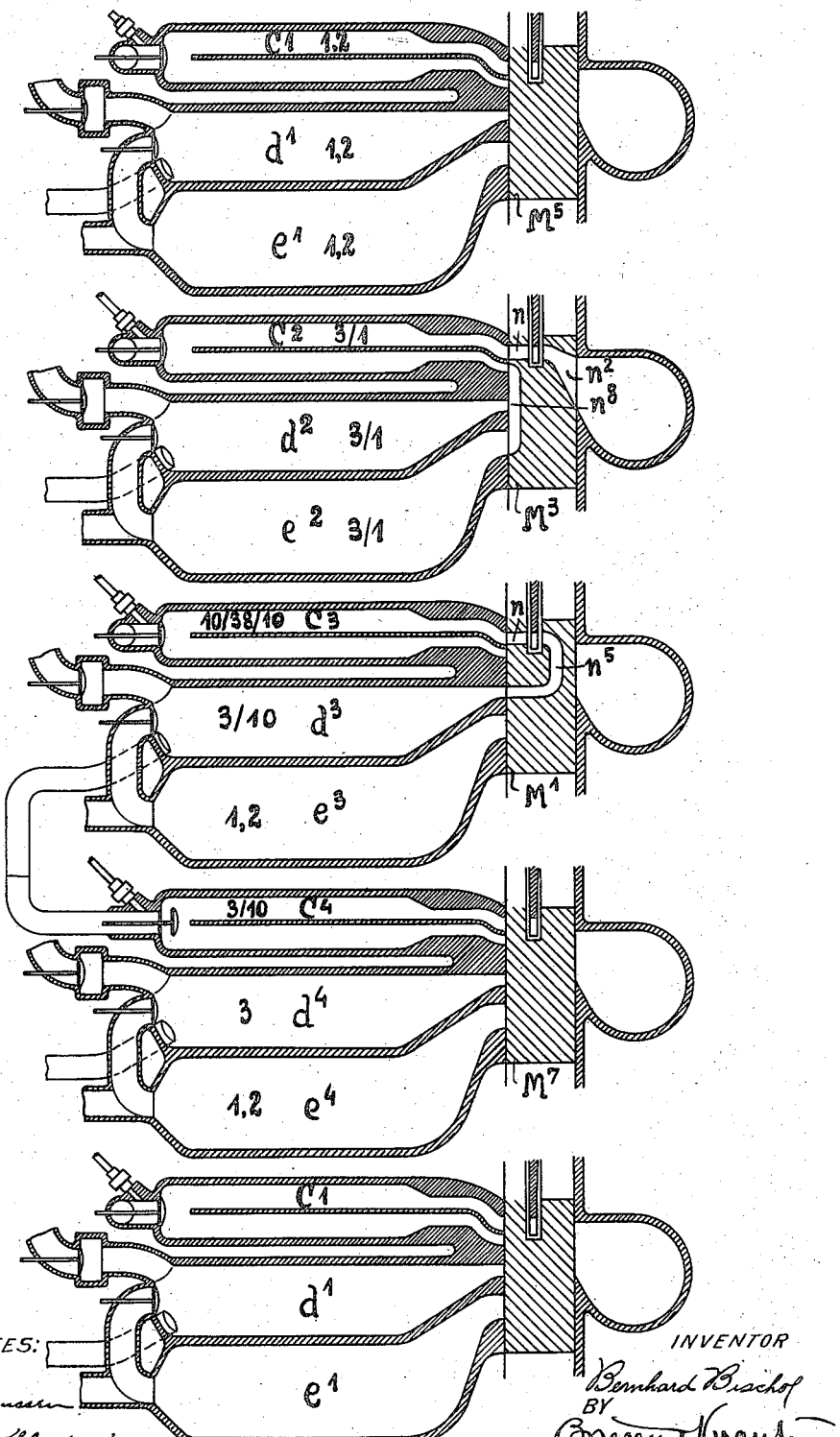

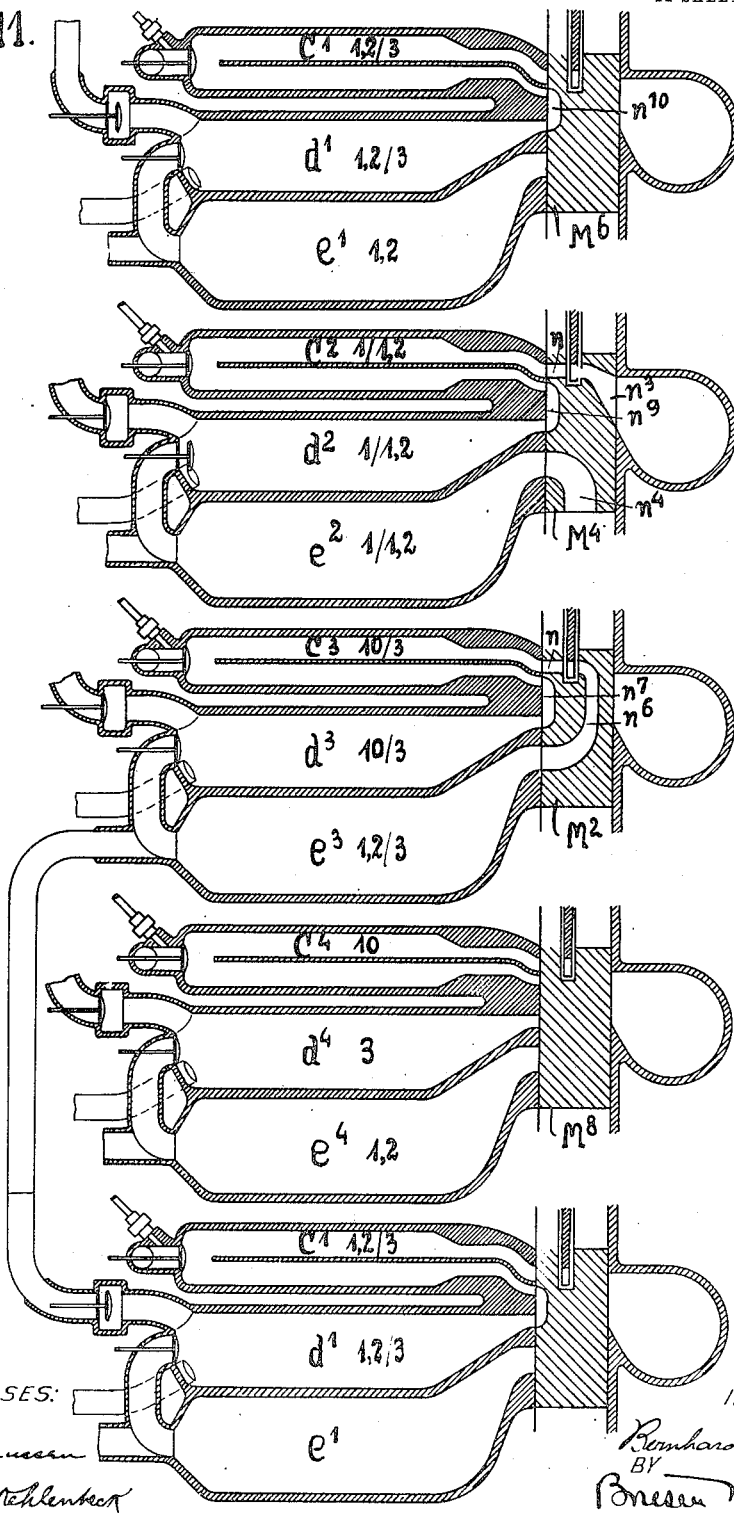

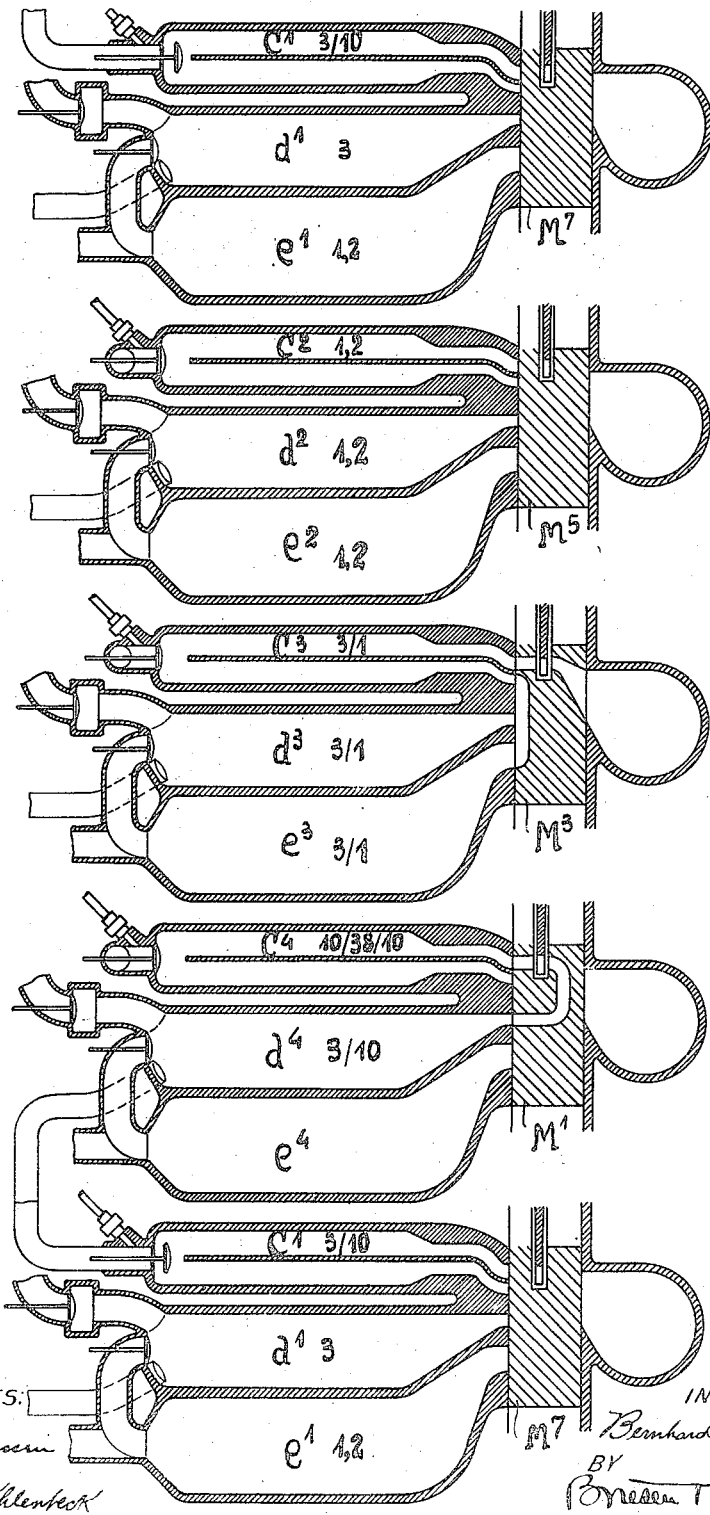

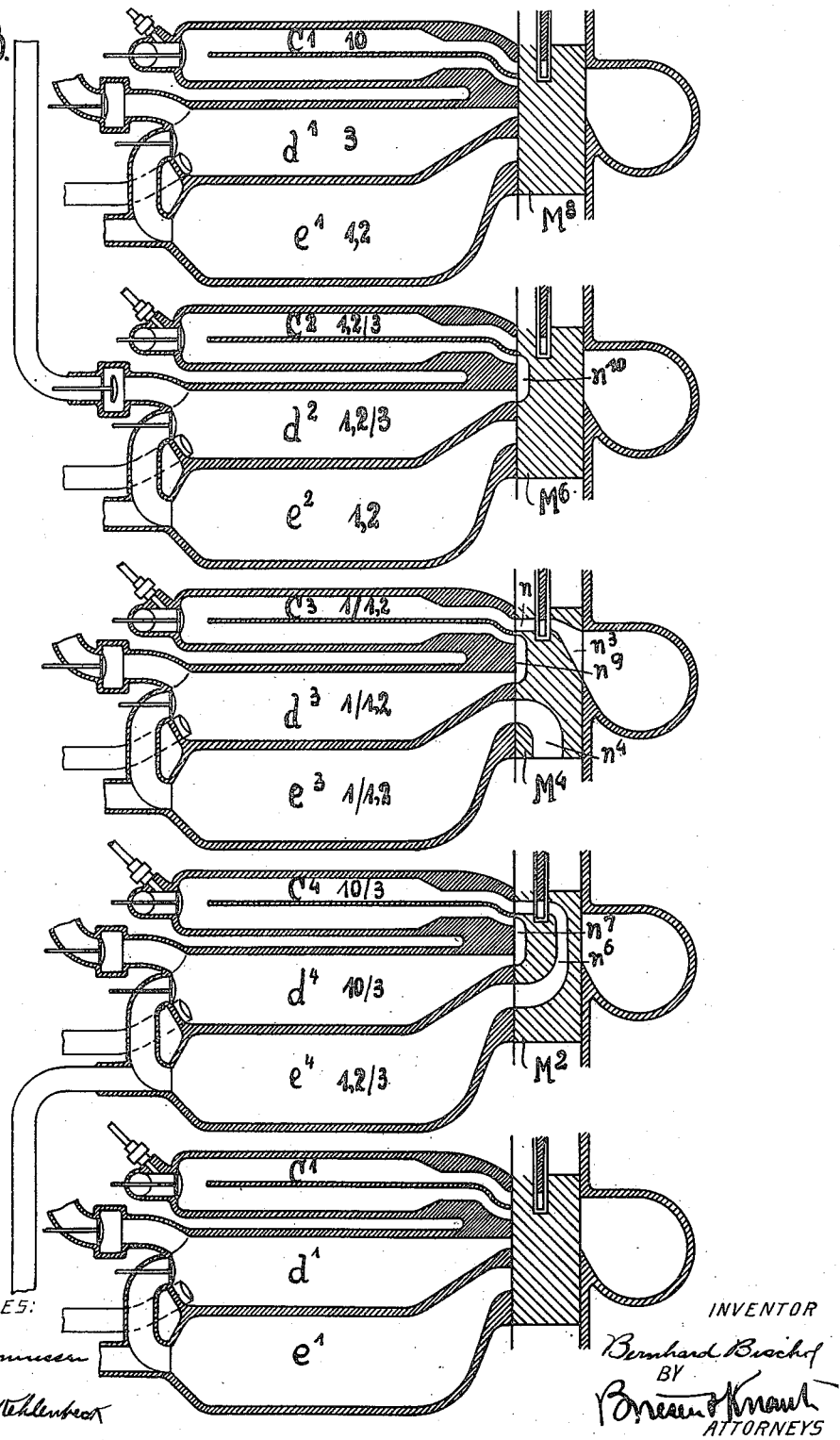

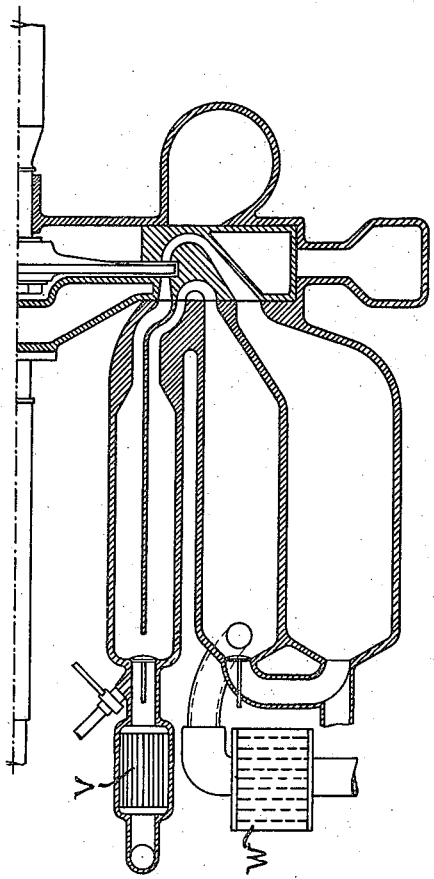

UNITED STATES PATENT OFFICE.

BERNHARD BISCHOF, OF NUREMBERG, GERMANY.

INTERNAL-COMBUSTION TURBINE.

1,129,544.  Specification of Letters Patent.  Patented Feb. 23, 1915.

Application filed October 20, 1914. Serial No. 867,603.

*To all whom it may concern:*

Be it known that I, BERNHARD BISCHOF, a citizen of the Republic of Switzerland, resident of Nuremberg, Germany, have invented certain new and useful Improvements in Internal-Combustion Turbines, of which the following is a specification.

My invention relates to internal combustion turbines and has for its object to improve the construction thereof and to provide a machine of this type, having a maximum of efficiency.

My improvement particularly contemplates an internal combustion turbine in which the use of a compressor is eliminated and in which the fuel mixture, or when employing fluid fuel the air, is directly compressed by means of the explosion gases in such a manner that no part of the latter gases accompanies the mixture or air into the explosion chambers.

Other objects of my improvement will appear from the description hereinafter and the features of novelty will be pointed out in the appended claims.

Reference is to be had to the accompanying drawings in which—

Figure 3:
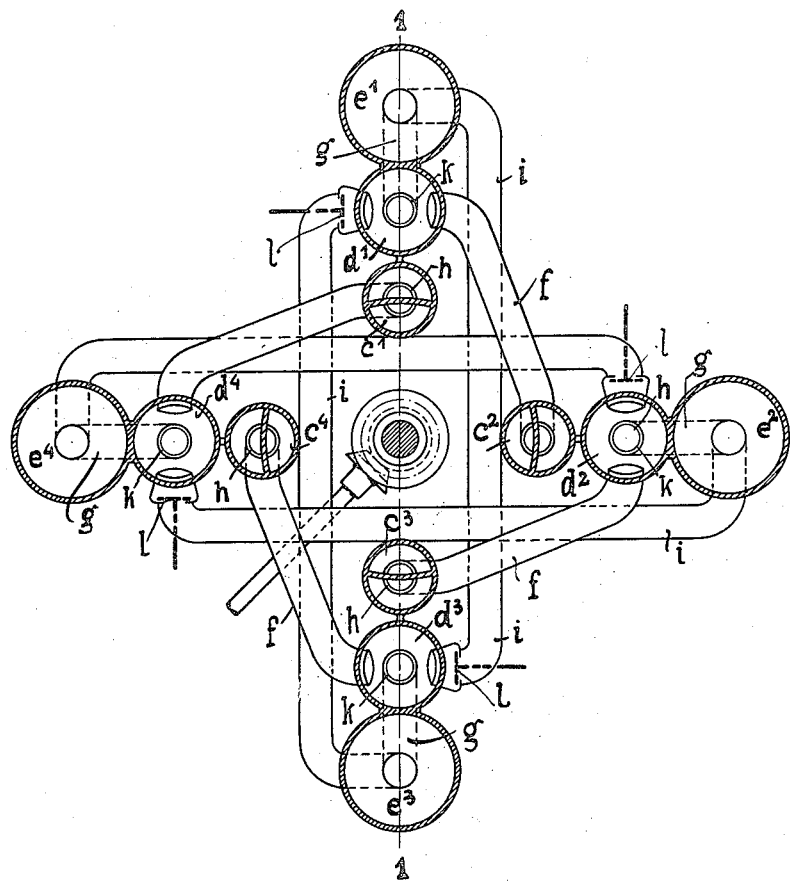
Figure 4:
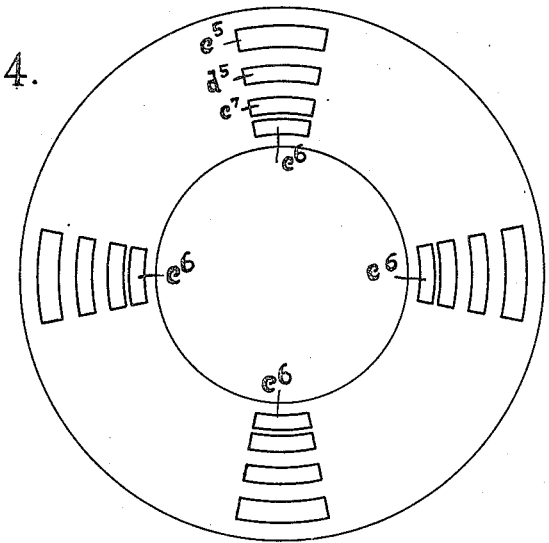
Figure 5:
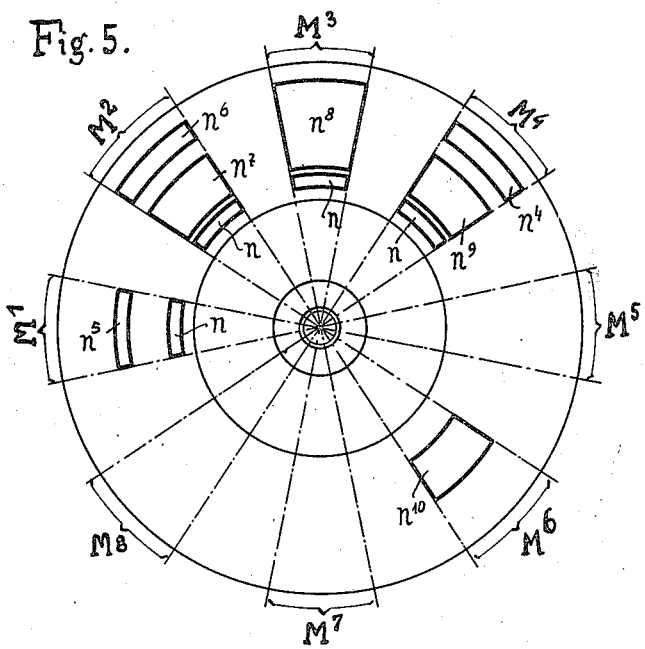

Figure 1 is a diagrammatic vertical section of my improved turbine taken approximately on the line 1—1 of Fig. 3; Fig. 2 is a detail sectional view showing the parts in a different position; Fig. 3 is a vertical diagrammatic section taken substantially on the line 3—3 of Fig. 1; Fig. 4 illustrates in face view a diagram of the chamber openings; Fig. 5 is a diagrammatic face view of the rotary valve member; Figs. 6 to 13 inclusive are diagrammatic sectional views illustrating the different steps in the operation of my turbine; and Fig. 14 is a detail section of a slightly different form of my improvement.

As shown in the drawings the turbine comprises a series of explosion or combustion chambers $c^1$, $c^2$, $c^3$ and $c^4$ arranged concentrically about the axis of the turbine upon a suitable supporting frame, each explosion chamber being provided with a partition $c^5$ which extends from the mouth or opening thereof to a point at a distance from the opposite end and whereby the said explosion chambers are each formed with two end openings $c^6$ and $c^7$. In the illustrated form two compression chambers designated respectively as a first and second compression chamber are arranged and suitably supported adjacent to each explosion chamber $c^1$, $c^2$, $c^3$, and $c^4$, said compression chambers being indicated by the reference characters $d^1$, $e^1$, $d^2$, $e^2$, $d^3$, $e^3$ and $d^4$, $e^4$ respectively. The said compression chambers are respectively provided with end openings $d^5$ and $e^5$ located in close proximity to the end openings $c^6$ and $c^7$ of the explosion chambers, the openings $c^6$, $c^7$, $d^5$, $e^5$ all terminating in a common vertical plane and communicating with an annular guideway $m^1$ as shown in Fig. 1. An annular air-channel $p^1$ communicating with the atmosphere or a source of air supply surrounds said guideway $m^1$ and is connected therewith by means of connections $p^2$, the said guideway $m^1$ being further arranged in communication with an annular exhaust channel $o$ having an outlet $o^1$ as also shown in said Fig. 1. A valve member $m$ is rotatably fitted in said guideway $m^1$ and is carried by a shaft $q$ journaled in bearings $q^1$ and driven in any suitable manner as by bevel gears $r$ and $s$ the latter being connected with any desired type of driving machine as for instance an electric motor (not shown). The said valve member $m$ as arranged is movable across the end openings $c^6$, $c^7$, $d^5$ and $e^5$ of the explosion and compression chambers and across the connections $p^2$ of the air channel $p$ and the inlets to the exhaust channel $o$, said member $m$ being provided with nozzles $n$ adapted to establish communication between the explosion chambers and an annular recess $n^1$ formed in said member $m$. The said member $m$ is further formed with channels $n^2$—$n^3$ connected with said recess $n^1$ and adapted to communicate with the exhaust channel $o$ and with a channel $n^4$ arranged to connect the chambers with the air channel $p$ as will be more fully described hereinafter. In addition to the above the valve member $m$ is provided with channels $n^5$, $n^6$, $n^7$, $n^8$, $n^9$ and $n^{10}$ the purpose of which will be clearly set forth further on in the description. The turbine wheel $a$ is carried by a shaft $b$ rotatably mounted in bearings $b^1$ and has its periphery provided with blades $a^1$ adapted to rotatably travel in the recess $n^1$ as shown in Fig. 1, said shaft $b$ being adapted for connection with the particular mechanism, such as for instance a dynamo, which is to be driven.

From the drawings it will be seen that each explosion chamber and two compression chambers form a group having their end openings located in close proximity to each other, the groups for convenience of description being designated as 1st group, 2nd group, 3rd group and 4th group respectively.

The rear ends of the explosion chambers $c^1$, $c^2$, $c^3$ and $c^4$ are connected by means of tubes or pipes $f$ respectively with the next rearward or preceding compression chambers $d^1$, $d^2$, $d^3$ and $d^4$, the directions in which the explosions proceed from group to group being designated as forward, the said compression chambers $d^1$, $d^2$, $d^3$ and $d^4$ for the purposes of description being indicated as the second compression chamber in each group. These tubes or pipes $f$ may be closed or controlled in any suitable manner as by means of valves $h$. Each compression chamber $e^1$, $e^2$, $e^3$ and $e^4$ designated herein as the first compression chamber is connected by means of a tube or pipe $g$ with the adjacent second compression chambers $d^1$, $d^2$, $d^3$ and $d^4$ in each group, said first compression chambers $e^1$, $e^2$, $e^3$ and $e^4$ being further connected by means of tubes $i$ with the second following, forwardly located second compression chamber $d^1$, $d^2$, $d^3$ and $d^4$. Thus $e^1$ is connected with $d^3$, $e^2$ with $d^4$, $e^3$ with $d^1$ and $e^4$ with $d^2$ by means of said tubes $i$. The tubes $g$ and $i$ may also be controlled or closed in any suitable manner, the illustration showing valves $k$ in the tubes $g$ and valves $l$ in the tubes $i$, it being understood that these valves as well as the valves $h$ may be automatic return valves or check valves as desired.

For the purpose of illustrating the operation it is assumed that my improved turbine is being driven by fluid fuel in which case all the chambers before the initial explosions are filled with fresh air conducted from the atmosphere or other source of air supply through the inlet $p^1$, channel $p$ and connections $p^2$. The addition of fuel now takes place only in the explosion chamber $c^1$, the said fuel being sprayed into the air contained therein in any suitable manner as for instance by means of the arrangement $t$ shown in Fig. 2, it being understood that any suitable type of ignition devices may be used for causing the explosion. After the explosion has taken place the combustion gases at high pressure expand through the nozzle and by impacting against the blades $a^1$ actuate the turbine wheel $a$ and shaft $b$, then pass through the channel in the valve member $m$ into a compression chamber and push or transfer the air therein into a next chamber and then compress the same after which upon a repetition of the proceeding said gases pass out through the exhaust. The compression may take place in one or two steps; the illustrated form shows a compression of two steps whereof as already stated two compression chambers are combined with each explosion chamber. In this case, after all the chambers are filled with air, the air for instance contained in a first compression chamber is pushed or transferred by the explosion gases into a second compression chamber and thereby compressed for example to a pressure of 3 atm. This compressed mass of air is then pushed from said compression chamber into an explosion chamber whereby it is further compressed for example to a pressure of 10 atm., and after fuel has been sprayed in as above described is exploded by the suitable ignition means hereinbefore mentioned. The resulting explosion gases impact against the blades of the turbine wheel and actuate the latter and at the same time compress the air for the next explosion in the next explosion chamber.

The various steps of the operation, which I will now describe, are clearly shown in Figs. 6–13 inclusive in which by way of example a turbine with four explosion chambers is shown each of which is combined with a first and second compression chamber. The illustration is diagrammatic, the four groups being located one beneath the other and a fifth group, which in reality corresponds to the first group, is added in order to simplify the explanation. The connections $f$, $g$ and $i$ are in the main omitted and are fully shown only in the diagrams illustrating the steps in which they come into use. Next is to be assumed that the chambers are filled with fresh air, the explosion chamber $c^1$ with air having a pressure of 10 atm. and the chambers $d^1$ and $d^2$ with air of 3 atm. pressure. The manner in which these pressures are obtained will be more clearly brought out hereinafter, it being understood that all pressure estimates given indicate absolute tensions. Fuel is now introduced into $c^1$ and ignited, and the pressure therein is consequently raised for example to 38 atm. The actuated valve member $m$ having been moved to bring the portion thereof indicated at $M^1$ to the position shown in Fig. 6, the explosion gases pass through the nozzle $n$ and by impacting against the blades $a^1$ rotate the turbine wheel $a$ and pass through the channel $n^5$ and opening $d^5$ into the chamber $d^1$. The said gases thus drive or transfer the air in the chamber $d^1$ from the latter through the tube $f$ into the explosion chamber $c^2$ of the second group of chambers and compress said air in said chamber $c^2$. After equalization of pressure has taken place a pressure of 10 atm. prevails in $c^1$, $d^1$ and $c^2$, the latter chamber containing air and the chambers $c^1$ and $d^1$ gas, the initial and final pressures present in said chambers being indicated in Fig. 6 which illustrates the parts in the position occupied during this first step of the operation.

The second step is illustrated in Fig. 7. The valve member $m$ has been moved to bring the portion indicated as $M^2$ opposite the first group of chambers in this figure so that the gases in the chambers $c^1$ and $d^1$ in expanding from the pressure of 10 atm. pass from the chamber $d^1$ through the opening $n^7$ into the chamber $c^1$ and from there through the nozzle $n$ and continue the actuation of the wheel $a$ by impacting against the blades $a^1$. After passing the blades $a^1$ the said gases travel through the channel $n^6$ into the chamber $e^1$ so that the air in the latter is driven therefrom through the tube $i$ into the second following compression chamber $d^3$ forming part of the third group of chambers. From this chamber $d^3$ the said air passes through the channel $n^{10}$ into the explosion chamber $c^3$ of this third group, the member $m$ meanwhile occupying a position with the portion $M^6$ opposite this latter group. After equalization of pressure has again taken place a tension of 3 atm. prevails in the chambers $c^1$, $d^1$, $e^1$, $d^3$ and $c^3$ the last two containing air and the first three containing gas. During this step the chambers of the second group remain idle, while the chambers of the fourth group are connected with the air channel $p$.

The third step is illustrated in Fig. 8. The valve member $m$ has now been advanced to bring the portion $M^3$ opposite the first group of chambers in this figure so that the gases remaining in the chambers $c^1$, $d^1$ and $e^1$ at 3 atm. pass from the chambers $d^1$ and $e^1$ through the channel $n^8$ into the chamber $c^1$ and from there through the nozzle $n$ and by impacting against the blades $a^1$ continue the actuation of the wheel $a$ and pass through the channel $n^2$ into the exhaust channel $o$ so that the tension in chambers $c^1$, $d^1$ and $e^1$ sinks from 3 to 1 atm. At the same time the portion $M^1$ of the member $m$ occupies a position opposite the second group of chambers corresponding to the first step shown in Fig. 6 so that as explosion takes place in chamber $c^2$ concurrently with the exhaust in chambers $c^1$, $d^1$ and $e^1$ the gases at 38 atm. pressure pass from the chamber $c^2$ through the nozzle $n$ and impact against the blades $a^1$ to still further continue the actuation of the wheel $a$. After leaving the blades $a^1$ these gases travel through the channel $n^5$ into the chamber $d^2$ and force the air therefrom through the tube $f$ into the explosion chamber $c^3$ of the third group and there compress the same. The initial and final tensions or pressures accompanying this step of the operation are again indicated in the various chambers.

The fourth step is shown in Fig. 9. The valve member $m$ has further been advanced so that the portion $M^4$ thereof occupies a position opposite the first group of chambers, while the portion $M^2$ has moved to a position opposite the second group, the third group being sealed by means of the sealing portion $M^8$ while that portion of the member $m$ indicated as $M^6$ is opposite the fourth group. In this step fresh air passes from the air channel $p$ through the channel $n^4$ into the chamber $e^1$ and from thence through the tube $g$ into the chamber $d^1$ and through the channel $n^9$ into the explosion chamber $c^1$ so that the said chambers $c^1$, $d^1$ and $e^1$ are in this manner thoroughly scavenged and any gases which remain therein travel through the nozzle $n$ beyond the blades $a^1$ and through the channel $n^9$ into the exhaust channel $o$. The pressure of this scavenging air raises the tension in the above mentioned chambers for instance 1, 2 atm. In the second group of chambers the explosion gases from the chambers $d^2$ and $c^2$ meanwhile pass through the nozzle $n$, impact against the blades $a^1$ to continue the actuation of the wheel $a$ and then travel through the channel $n^6$ into the chamber $e^2$. The air is in this manner driven from this chamber $e^2$ through the tube $i$ into the chamber $d^4$ of the fourth group and through the channel $n^{10}$ into the explosion chamber $c^4$ of this group this proceeding in the second and fourth groups corresponding to the step illustrated in Fig. 7 as taking place in the first and third group of chambers. The third group of chambers during these latter operations remain idle.

The fifth step is illustrated in Fig. 10. In this figure the valve member $m$ has been further moved to bring the portion $M^5$ opposite the first group of chambers, the portion $M^3$ being opposite the second group and the portion $M^1$ being opposite the third group of chambers while a sealing portion $M^7$ closes the fourth group of chambers. In this step scavenging of the chambers $c^1$, $d^1$, and $e^1$ may continue or said chambers may be sealed by the portion $M^5$ as shown and remain idle. The gases in the chambers $c^2$, $d^2$ and $e^2$ are passing into the exhaust channel $o$ in the same manner as described with regard to the first group in Fig. 8 while explosion is taking place in the chambers of the third group so that the gases resulting therefrom after actuating the wheel $a$ are compressing the air in the explosion chamber $c^4$ of the fourth group in the same manner as described with respect to the first and second groups of Fig. 6 and the second and third groups of said Fig. 8.

The sixth step is shown in Fig. 11. At this stage the valve member $m$ has been moved to bring the portion $M^6$ thereof opposite to the first group of chambers, while the portions M⁴ and M² are located respectively opposite the second and third group of chambers and the fourth group is sealed by the portion M⁶. The operation in the third and first groups of chambers at this stage is the same as in the first and third groups during the second step shown in Fig. 7 or the second and fourth groups in Fig. 9 while the chambers of the second group are being scavenged in a manner similar to the chambers $c^1$, $d^1$ and $e^1$ in Fig. 9.

The seventh step is shown in Fig. 12. The valve member $m$ has now reached a position in which the portion $M^1$ thereof is opposite the fourth group in which explosion has taken place so that the air in the first group is being compressed as hereinafter described, the chambers of the said first group being sealed by the portion $M^7$ of the valve member $m$. At the same time the portion $M^3$ of the said member $m$ is opposite the third group of chambers so that exhaust is taking place in the latter while the second groups are sealed and idle.

The eighth position is shown in Fig. 13. The valve member $m$ has now been brought to a position in which the sealing portion $M^8$ of said member is opposite the first group of chambers $c^1$, $d^1$, $e^1$, which in consequence remain sealed and are idle at this stage, the explosion chamber containing air under compression. At the same time the portions $M^6$, $M^4$ and $M^2$ of said member are opposite the second, third and fourth groups of chambers respectively, so that the explosion gases traveling from the chambers $d^4$ and $c^4$ after passing the blades $a^1$ and actuating the wheel $a$ will drive the air from $e^4$ through $i$ and into $d^2$ and $c^2$. Concurrently with this operation the chambers $e^3$, $d^3$ and $c^3$ are being scavenged. The valve member $m$ now again reaches its initial position so that the first step shown in Fig. 6 is repeated, this cycle being continuously repeated during the operation of the turbine with one explosion in each group, the steps in each explosion chamber being as follows: air and fuel intake, compression, ignition and explosion, exhaust and scavenging. The initial pressure as well as succeeding pressures are indicated in figures denoting atmospheres in each of the figures from Figs. 6 to 13 inclusive. The arrows in Fig. 5 clearly indicate the path of the various gases through the valve plate channels while the coöperating chamber openings are clearly indicated in Fig. 4.

It will be seen from the above description that the explosion gases in addition to actuating the turbine wheel, also serve to compress the air for the next explosion so that a compression mechanism is absolutely avoided, one or more compression chambers being located in front of each explosion chamber.

The various chambers are so proportioned that during the transferring and compression of the air by the gas from one chamber or group to the other absolutely no gas is carried along with the air, the consequence of which is that the explosion chambers are filled only with clean mixtures absolutely free from combustion gases and their attendant injurious effects. The present invention in this respect is fundamentally different from internal combustion turbines heretofore known and owing to the above advantage has a much higher degree of thermal efficiency than such existing turbines. Exhaustive calculations on the basis of entropy diagrams have definitely proven, that with similar fundamental conditions existing, thermal efficiency can be obtained in this present invention which with similar temperatures in the turbine wheel and above mentioned parts is almost twice as high in the present machine as in existing similar structures. In the present case it will further be noted that the explosion gases are constantly conducted through the valve member and turbine wheel thus continuously actuating the latter, while the air masses on the contrary travel in the opposite direction through the rearwardly extending chamber connections. With this arrangement it is therefore also possible to cool the air at each compression for instance by passing same through a cooler located between the chamber, without having the cooler disturbed or affected by the explosion gases. In consequence of this no energy is abstracted from the latter and the cooling serves only to advantageously increase the entire working efficiency of the turbine. Fig. 14 shows an example of how such arrangement may be brought about, the coolers being indicated by the reference characters $v$ and $w$.

It will of course be understood that the turbine instead of having four groups of chambers may be provided with more, for instance eight or twelve, the construction of the valve member $m$ being changed correspondingly to secure the proper coöperation as will be clearly apparent.

Various changes in the specific forms shown and described may be made within the scope of the claims without departing from the spirit of my invention.

I claim:

1. In an internal combustion turbine, the combination of a plurality of explosion chambers, nozzles adapted to communicate with said explosion chambers, a turbine wheel movable adjacent to said nozzles, compression chambers, and connections from said explosion chambers to said compression chambers through which the explosion gases after passing through the nozzles and actuating the turbine wheel drive the driving medium from one compression chamber into another chamber and there compress the same.

2. In an internal combustion turbine, the combination of a plurality of explosion chambers, a compression chamber adjacent to each explosion chamber and forming therewith a chamber group, a connection from the compression chamber of one group to the explosion chamber of the next group, a turbine wheel and a valve member controlling said chambers and arranged to conduct the explosion gases from the explosion chambers to the turbine wheel to actuate same and into the compression chamber of the same group whereby the driving medium in said compression chamber is driven by said gases through said connection into the explosion chamber of the next group and there compressed.

3. In an internal combustion turbine, the combination of a series of explosion chambers, a first and second compression chamber adjacent to each explosion chamber and forming therewith a chamber group, a tube connecting the first compression chamber of one group with the second compression chamber of another group, a connection from the second compression chamber of one group to the explosion chamber of another group, a turbine wheel, a valve member controlling said chambers, means in said member for conducting the explosion gases from an explosion chamber to the turbine wheel to actuate same and into the second compression chamber of the same group whereby the driving medium in said second compression chamber is driven through said connection into the explosion chamber of another group and there compressed and means in said valve member for conducting the said explosion gases across the turbine wheel and into the first compression chamber of the said same group whereby the driving medium in said first compression chamber is driven through said tube into the second compression chamber of another group and there initially compressed.

4. In an internal combustion turbine, the combination of a series of explosion chambers, a first and second compression chamber adjacent to each explosion chamber and forming therewith a chamber group, a tube connecting the first compression chamber of one group with the second compression chamber of another group, a connection from the second compression chamber of one group to the explosion chamber of another group, a conduit connecting the first and second compression chambers of each group with each other, an exhaust tube, a turbine wheel, a valve member controlling said chambers and said exhaust tube, means in said member for conducting the explosion gases from an explosion chamber to the turbine wheel to actuate same and into the second compression chamber of the same group whereby the driving medium in said second compression chamber is driven through said connection into the explosion chamber of another group and there compressed, means in said valve member for conducting the said explosion gases across the turbine wheel and into the first compression chamber of said same group whereby the driving medium in said first compression chamber is driven through said tube into the second compression chamber of another group and there initially compressed and means in said valve member for conducting the gases remaining in the first group to the exhaust tube.

5. In an internal combustion turbine, the combination of a series of explosion chambers, a first and second compression chamber adjacent to each explosion chamber and forming therewith a chamber group, a connection from the second compression chamber of the first group to the explosion chamber of the second group, a tube connecting the first compression chamber of the first group with the second compression chamber of the third group, a conduit connecting the two compression chambers of each group with each other, an air inlet, an exhaust tube, a turbine wheel, a movable valve member controlling said chambers, said air inlet and said exhaust, means in said member for conducting the explosion gases from the explosion chamber of the first group to the turbine wheel to actuate same and into the second compression chamber of said first group whereby the driving medium in said second compression chamber is driven through said connection into the explosion chamber of the second group, means in said valve member for conducting the said explosion gases across the turbine wheel and into the first compression chamber of the first group whereby the driving medium in said first compression chamber is driven through said tube into the second compression chamber of the third group and there initially compressed, means for conducting the gases remaining in the first group across the turbine wheel into the exhaust tube and means in said valve member for connecting the chambers of the first group with the air inlet whereby said chambers are scavenged.

6. In an internal combustion turbine, the combination of explosion chambers, compression chambers, connections between said chambers, a turbine wheel, means for conducting explosion gases to said turbine wheel to actuate same and to initially compress the driving medium in an explosion chamber and to further compress said driving medium in said explosion chamber.

7. In an internal combustion turbine, the combination of explosion chambers having front end openings, compression chambers having front end openings, a turbine wheel, a valve member surrounding said wheel and controlling said front end openings, and connections between said chambers located at the rear ends thereof whereby explosion gases exclusively pass through said valve member and force driving medium from said chambers exclusively through said connections to compress the said driving medium.

8. In an internal combustion turbine, the combination of explosion chambers having front end openings, compression chambers having front end openings, a turbine wheel, a valve member surrounding said wheel and controlling said front end openings, connections between said chambers located at the rear ends thereof whereby explosion gases exclusively pass through said valve member and force driving medium from said chambers exclusively through said connections to compress the said driving medium and cooling devices located in said connections for cooling said driving medium, the areas of said chambers, connections and cooling devices being so proportioned that no gases can reach said cooling devices.

In testimony whereof I have hereunto set my hand in the presence of two subscribing witnesses.

BERNHARD BISCHOF.

Witnesses:
GEORG V. HAUFFSTENGEL,
OSCAR BOCK.